2,915,108
RE-TREADING MACHINE
Roger Antraigue, Paris, France
Application November 16, 1954, Serial No. 469,257
Claims priority, application France October 9, 1954
8 Claims. (Cl. 154—9)

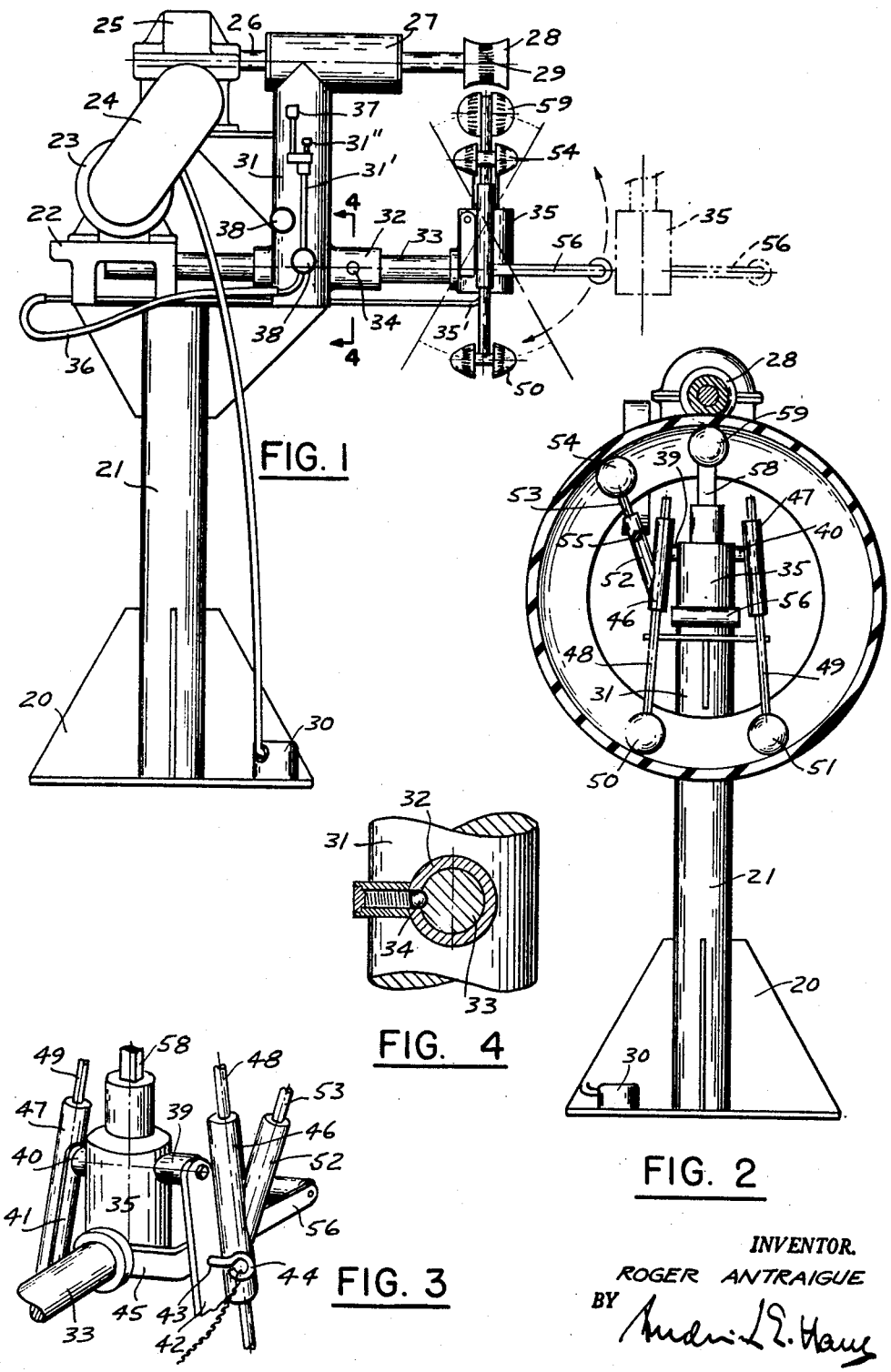

This invention relates to a machine for applying new treads to tires. An object of the invention is to provide such a machine which will bond a band of raw gum to a tire carcass throughout the width of the band, in such a way that the resulting new tread will have a substantially uniform thickness even though the tire carcass may have an irregular thickness, as for instance owing to the presence of previously applied repair patches.

A machine according to the invention may possess the following characteristics, singly or in combination:

(1) The tire casing is supported on a structure which is so displaceable as to present to the pressure roller areas of the band variously displaced transversely of the tire tread.

(2) The said structure is further mounted slidably so as to enable the tire carcass to be disengaged from the pressure roller, for insertion and removal of the latter.

(3) The pressure for applying the band to the tire is provided by compressed air.

(4) The tire carcass performs a revolution defined by a roller assembly.

(5) The assembly mentioned above includes two rollers in addition to the retreading pressure roller.

(6) The assembly includes a third roller disposed at a comparatively small angular distance from the pressure roller.

(7) The first mentioned two rollers are carried on rods or spindles freely slidable in sleeves.

(8) The pressure roller exerts its action on the inner surface of the tire carcass.

(9) The compressed air cylinder for providing the retreading pressure is arranged within the space defined by the tire casing.

In the ensuing description given by way of example of one embodiment of the invention, reference is made to the accompanying drawings, wherein:

Fig. 1 is a side elevation;

Fig. 2 is a front view;

Fig. 3 is an enlarged perspective view of part of the machine;

Fig. 4 is a section on line 4—4 of Fig. 1, on an enlarged scale.

The machine comprises a base 20 having an upright post 21 supporting the frame 22 of an electric motor 23. The motor is connected by a belt drive protected by a cover 24 to a reduction gearing 25 having an output shaft 26 mounted for rotation in a bearing 27. The output shaft 26 carries at its free end a spool-shaped drive roller 28 having ribs or corrugations 29 formed on an intermediate part of its surface. The motor is controlled by means of a pedal 30. Any suitable connections may be provided from the pedal to the motor switch such that depression of the pedal will start the motor and release of the pedal will stop the motor, or alternatively such that starting and stopping the motor require depressing the pedal twice in succession. The bearing 27 is supported on a post 31 forming part of the frame, the said post further supporting a bearing 32 parallel with the bearing 27. Slidably mounted in bearing 32 is a rod 33, means being provided for preventing rotation of the rod in its bearing. Means such as a spring-pressed ball 34 are provided for locating the rod 33 in a predetermined longitudinal position relatively to the bushing 32. Secured on the rod 33 is a pneumatic cylinder 35 which may be connected with any suitable pressure source through a pipe 35′ a flexible line 36 and a pipe 31′. The latter ends in a nipple 31″ for connection to the pressure source. A valve 37 is provided for controlling the admission of compressed air into the space under the piston in the cylinder and for connecting said space with the atmosphere. An adjustable pressure reducer 38 with a manometer 38′ is provided for controlling the working pressure of the air delivered into the cylinder. Protruding from the cylinder 35 in opposite relationship are a pair of tubular extensions 39 and 40 serving to pivot a pair of plates 41 and 42. The plate 42 is formed with a hole 43 into which a pin 44 may be inserted. A bracket 45 having unequal arms bent at right angles to each other is also formed with a hole for cooperating with the pin 44 in a manner to be later explained. Secured to plates 41 and 42 as by welding are a pair of bushings 46 and 47 serving to guide a pair of rods 48 and 49 carrying rollers 50 and 51 at their lower ends. Secured to the bushing 46 as by welding is a further bushing 52 serving to guide a rod 53 carrying a roller 54 at its upper end. Means are provided, such as a wing-screw 55, for blocking the rod 53 with respect to the bushing 52. Also secured to the plates 41 and 42 is a guide arm or handle 56.

The piston rod 58 associated with the air cylinder 35 carries a pressure roller 59. This roller is adapted to cooperate with the driver and backing roller 28.

The arrangement operates as follows: To insert a tire the handle 56 is pulled so as to bring roller 59 to a position forward of roller 28. After first having adjusted the distance by which arm 53 projects, in accordance with the size of the tire to be retreaded, the tire is placed upon the rollers 54 and 59. Then the rollers 50 and 51 are allowed to drop by their own weight so that they will contact the inner surface of the tire carcass. The handle 56 is then pushed back until the spring pressed ball 34 enters its notch (or operates any other means having the same function), at which time the center planes of rollers 54, 59, 50 and 51 coincide with the center plane of roller 28. The guiding structure is placed in its horizontal position by inserting the pin 44 into the hole 43 in strip 42 and the hole in the bracket 45. Then pressure is allowed into the air cylinder whereupon the roller 59 is applied against the tire carcass. The new tread band is fitted in the usual way between the roller 28 and the tire carcass, and the motor 23 is started by acting on pedal 30. When the tire carcass has completed one revolution the tread band is firmly bonded to the tire. The bond between the central part of the band and the tire may be strengthened by causing the tire to make more than one revolution. Both during the phase of the process in which the new tread is applied, and during the last few revolutions, the operator, does not have to watch the correct positioning of the tire carcass since the latter will of its own accord assume the most favorable position with regard to the desired result. Owing to the fact that the pressure application of roller 59 is produced by the action of compressed air the new tread bonded to the tire carcass has a uniform thickness even if there are variations in the thickness of the tire carcass, as for example due to the presence of patches on the inner surface of the tire as a result of previous repairs.

To complete the retreading operation, the operator while continuing to rotate the tire carcass may align with the roller 28 first one and then the other of the marginal sections or sides of the tire. For this purpose the guiding device is released by withdrawing the pin 44, then the handle 56 may be pushed in for example so as to rock the roller carrying structure by rotation of the plates or arms 41 and 42 about the axis of the tubular extensions 39 and 40. As illustrated in Fig. 1, pushing the handle 56 will cause the left margin of the new tread to be applied against the tire. After this side has been completed, the handle 56 is lifted above the horizontal position so that the right side of the new tread is applied against the tire carcass through cooperation of roller 59 with roller 28.

To remove the thus retreaded tire the handle 56 is returned to its horizontal position, the pin 44 is put back into place, thereby blocking the guiding assembly, the motor 23 is stopped, and the pressure is released from air cylinder 35 by operating valve 37. Then the sliding frame is advanced by pulling the handle 56, thereby disengaging the roller assembly from the backing roller 28, whereupon the tire can easily be removed.

What I claim is:

1. A retreading machine for adhering a retread band of unvulcanized rubber to a tire carcass, comprising a support structure including a center part and several arms extending therefrom, the free ends of said arms being disposed in a generally circular line and engageable with the inner wall of a tire carcass for supporting and guiding the carcass, one of said arms being axially displaceable and the other arms constituting guide arms and being mounted angularly movable relative to said displaceable arm, yieldable pressure means coacting with the said displaceable arm for axially displacing the same, stationary abutment means mounted in alignment with said displaceable arm for insertion of the tire carcass and a retread band fitted thereupon between the stationary abutment means and the respective end of the displaceable arm thereby pressing said band against the respective wall of the carcass, and positioning means coacting with said movable arms for tilting the latter relative to a plane including said abutment means and said displaceable arm to vary the area of the carcass held in pressure engagement by said abutment means and said displaceable arm, and drive means for rotating a tire carcass fitted upon said arms upon its rotational axis.

2. A machine according to claim 1, wherein rounded heads are provided on the end of each arm for supporting the inner wall of the tire carcass thereon.

3. A retreading machine for adhering a retread band of unvulcanized rubber to a tire carcass, comprising a frame structure, a motor means supported on said frame structure, first bearing means mounted on said frame structure, a first rotary shaft horizontally seated in said bearing means, transmission means connecting the motor means to the shaft for rotating the latter, a counter and driving roller fixedly seated on said shaft, second bearing means mounted on said frame structure below said first bearing means and parallel therewith, a second horizontal shaft seated in said second bearing means axially slidable and secured against rotation, a perpendicular first headed arm supported by said second shaft axially slidable and in alignment with said roller for inserting a tire carcass and a retread band fitted thereupon between the roller and the arm head, actuating means mounted on said second shaft, said actuating means including a cylinder and a piston displaceable in the cylinder by pressure fluid and coacting with said arm for axially sliding the latter toward said roller, controllable pressure fluid conduit means supported on said frame structure for supplying pressure fluid to said actuating means, an arm assembly including a second headed arm engageable at its headed end with an area of the carcass closely spaced apart from the area pressed between said first arm head and said roller, mounting means supporting the other end of said second arm pivotal about an axis transversely of the median plane of said first arm head and said roller and approximately crossing a perpendicular line situated in said median plane, and actuating means for tilting said second arm about its axis whereby the carcass portion between said head of the first arm and said roller experiences a transverse shift.

4. A retreading machine for adhering a retread band of unvulcanized rubber to a tire carcass, comprising a supporting head engageable with an inner wall portion of a tire carcass for supporting the latter by suspending the carcass from said head, abutment means including a rotatable roller having a concave contour disposed in alignment with said head spaced apart from said head, yieldable pressure means for pressing said head toward said roller for pressing together a carcass suspended from said head and a retread band fitted upon the carcass between the head and the roller, drive means for rotating said roller, an arm assembly including a headed arm engageable at its headed end with an area of the carcass closely spaced apart from the area pressed between said head and said roller, mounting means supporting the other end of said arm pivotal about an axis transversely of the median plane of said head and said roller and approximately crossing a perpendicular line situated in said median plane, and actuating means for tilting said arm about its axis whereby the carcass portion between said head and said roller experiences a transverse shift.

5. A retreading machine for adhering a retread band of unvulcanized rubber to a tire carcass, comprising a frame structure, an abutment roller rotatably mounted on said frame structure, a support structure for supporting and guiding a tire carcass mounted on said frame structure slidable along a horizontal axis, several arms extending approximately radially from said support structure, a roller at the end of each arm and each engageable with the inner wall of the tire carcass for supporting the latter, one of said arms being axially displaceable into a position in which the roller thereon coacts with said abutment roller, yieldable pressure means for biasing the roller on said displaceable arm toward said abutment roller for pressing together the carcass and a retread band inserted between said abutment roller and the roller on said displaceable arm, mounting means supporting the arms other than said displaceable arm pivotal relative to a plane including said abutment roller and said displaceable arm, and actuating means coacting with said pivotal arms for pivoting the same into a selected pivotal position.

6. A machine according to claim 5 and further comprising locking means on said support structure and said pivotal arms for arresting the latter in the plane including said axially displaceable arm and said abutment roller.

7. A retreading machine according to claim 1 wherein one of said guide arms is adjustable in length and terminates in a head disposed circumferentially closely adjacent to the respective end of the displaceable arm and two other guide arms terminating each in a head disposed symmetrically opposite of the longitudinal center axis through said abutment means and said displaceable arm.

8. A retreading machine according to claim 7 wherein said two other guide arms extend downwardly relative to said displaceable arm and are composed of two telescoped portions, one of said portions of each one of said arms mounting the respective head and being freely slidable in the respective other portion whereby said heads engage and guide the inner wall of a fitted tire carcass by gravity.

References Cited in the file of this patent

UNITED STATES PATENTS

| | | |
|---|---|---|
| 2,121,252 | Marco | June 21, 1938 |
| 2,362,180 | Wilson | Nov. 7, 1944 |
| 2,474,511 | Bacon | June 28, 1949 |
| 2,498,953 | Glynn | Feb. 28, 1950 |
| 2,556,264 | Flynn | June 12, 1951 |
| 2,703,131 | Robbins et al. | Mar. 1, 1955 |
| 2,717,022 | Duerksen | Sept. 6, 1955 |